United States Patent [19]

Bailey

[11] 3,761,861

[45] Sept. 25, 1973

[54] CONDUCTIVE SHUNT FOR CIRCULAR LEAD PATTERN DEVICES

[75] Inventor: Richard J. Bailey, Tonawanda, N.Y.

[73] Assignee: GTI Corporation, Pittsburgh, Pa.

[22] Filed: June 29, 1972

[21] Appl. No.: 267,402

[52] U.S. Cl. .............. 339/19, 339/242, 174/DIG. 3, 206/46 H, 316/2 R, 317/16

[51] Int. Cl. .......................................... H01r 31/08

[58] Field of Search .................. 339/19, 22 R, 22 B, 339/242, 36, 198 R, 198 V, 198 N, 17 C, 17 CF; 206/46 ED, 56 A, 65 F, 56 DF; 174/DIG. 3, DIG. 5; 317/100, 101, 16, 2

[56] References Cited

UNITED STATES PATENTS

| | | | |
|---|---|---|---|
| 3,638,071 | 1/1972 | Altonen et al. | 317/2 R |
| 3,648,108 | 3/1972 | Bailey | 317/2 R |
| 3,622,688 | 11/1971 | Link et al. | 174/142 |

*Primary Examiner*—Marvin A. Champion
*Assistant Examiner*—Robert A. Hafer
*Attorney*—Joseph Weingarten, Lawrence A. Maxhan and Stanley M. Schurgin

[57] ABSTRACT

A shunt for an integrated circuit having leads disposed on the circumference of a circle has a wheel-shaped cross section with a hole for a lead between each pair of spokes and is formed from a conductive elastomer.

8 Claims, 2 Drawing Figures

CONDUCTIVE SHUNT FOR CIRCULAR LEAD PATTERN DEVICES

This invention relates to shunts for semi-conductors. It is more particularly concerned with a shunt for a multi-lead semi-conductor or integrated circuit having leads disposed around the circumference of a circle.

One of the drawbacks of metal oxide substrate semi-conductors (MOS) is their susceptibility to damage from static electricity discharge in handling and shipping. A standard precaution to prevent this is to short circuit all the leads while the device is being handled. However, the user of the devices generally tests them after receipt, and of course, must remove the short circuit to do so. Furthermore, the leads of the semi-conductor devices here concerned are made of round wire which is easily bent, and many users object to the deformation of leads occasioned by the rather primitive short circuiting expedients heretofore employed. As integrated circuits may have as many as ten leads in the TO-5 package and up to sixteen leads in the T0-8 package, and are produced and shipped in large volume, it is not commercially feasible to connect and disconnect leads individually.

It is an object of my invention, therefore, to provide a shunt or short circuiting device which can be rapidly applied to a multi-lead device and removed therefrom. It is another object to provide such a device which prevents bending of the leads. It is another object to provide such a device which also serves as a shipping carrier. It is another object to provide a one-piece device of the character abovedescribed. It is still another object to provide such a device which is molded from a conductive elastomer. Other objects will appear in the course of the description of my invention which follows.

An embodiment of my invention presently preferred by me is illustrated in the attached figures to which reference is now made.

Figure 1:
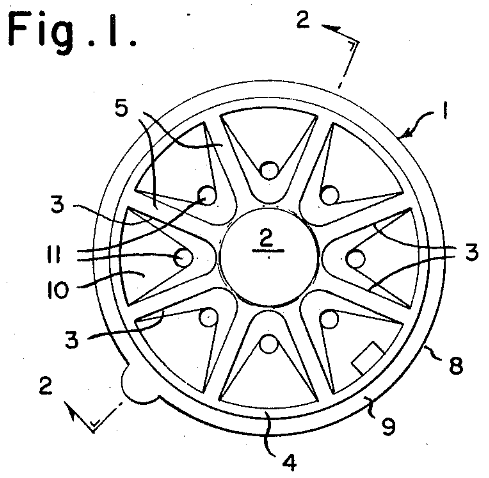
FIG. 1 is a plan of the article of my invention.
Figure 2:
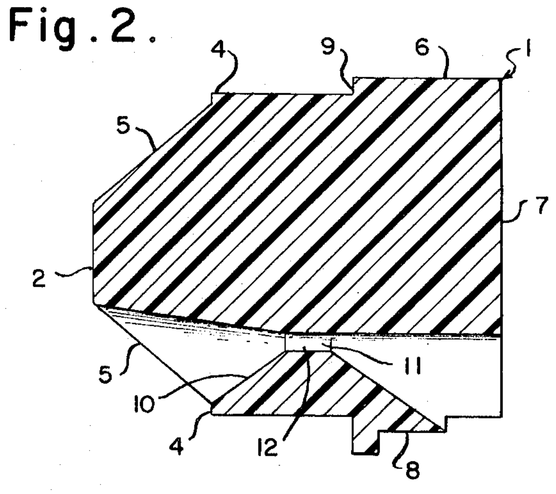
FIG. 2 is a cross section of the article of FIG. 1 taken on the plane 2—2 of that Figure.

The figures illustrate a shunt of my invention adapted for use with a semi-conductor or integrated circuit in a T0-5 package and having up to eight leads. My article has a cylindrical body 1 molded from a plastic material to be described. Body 1 is molded with a central hub portion 2 which extends from end to end thereof and a plurality of spokes 3 which extend radially from hub 2. The spokes 3 terminate in a rim portion 4 which does not extend the full depth of body 1 but is positioned intermediate the ends thereof. At one end of body 1 hub 2 projects axially beyond rim 4 and the outer edges 5 of the spokes 3 are inclined so as to connect the outer end of hub 2 with the edge of rim 4. At the other end of body 1 the ends 6 of the spokes 3 extend radially to a circular flange 8 which projects radially a slight distance 9 beyond rim 4. Flange 8 extends only part way toward the opposite end of body 1 leaving open at the end circumferential spaces between the radially projecting ends 6 of spokes 3. The ends 6 of the spokes extend axially to a flat end 7 of body 1.

The space between each pair of spokes 3 is occupied by a web 10 which from each end of body 1 tapers inwardly or converges to an axial hole 11 dimensioned to fit snugly around a lead of the semi-conductor device. The length 12 of the hole is made equal to at least two lead diameters. My article is formed with as many or more spokes 3 as there are leads of the semi-conductor with which it is to be used, and as many holes as there are spokes. The holes 11 are disposed on the circumference of a circle coaxial with body 1.

It will be observed that my article is similar in some respects to conventional pin or lead straighteners, and likewise to the holder device of Barnes et al. U.S. Pat. No. 3,516,044, of June 2, 1970. The article of the latter, however, is made from electrically non-conducting material. My device is made from a molded conductive elastomer which is softer and more readily deformable than the leads of the semi-conductor device with which it is used. It does not straighten them or give them a permanent set, but in addition to short circuiting them holds them aligned and prevents damage to them during shipping and handling.

I prefer to make my device, preferably by molding, from an elastomer containing sufficient carbon or other conductive additive to render it electrically conductive. A preferred elastomer is polyethylene or a copolymer of polyethylene and a vinyl. I prefer to use such material having a density of 1.08 gms/cc, tensile strength of about 2,000 psi, elongation of about 340%, water absorption 0.1% and volume resistivity of 10 to 20 ohms per cc. The additive introduced into the elastomer does not impair the flexibility of the product, which has, in fact, been used to some extent in the manufacture of electrical cables as a protective sleeve.

The holes 11 are formed with a diameter just sufficient to pass the semi-conductor leads. These leads are round wire, as I have mentioned, and are somewhat springy so that in the absence of restraint they maintain only approximate parallelism. When they are thrust into the holes 11 of my article they make contact with the side walls thereof, some in one region, some in another. To insure contact between lead and hole side wall, I prefer to dispose holes 11 around the circumference of a circle which is slightly greater or smaller in diameter than that of the lead circle of the semi-conductor.

As web 10 is tapered toward hole 11 from each end of my article, the semi-conductor leads may be inserted into the holes 11 from either end. However, removal of the semi-conductor is facilitated if it is pushed into my device at the end from which hub 2 projects. The case of the semi-conductor overhangs hub 2 leaving room for the fingers to engage the case under surface adjacent my device.

For shipping purposes my device, loaded with a semi-conductor, is inserted into a hole in a container tray. The hole is of a diameter greater than that of rim 4 but less than that of flange 8. The ends of the leads inserted into holes 11 are visible in the open spaces between the ends 6 of spokes 3 so that the presence or absence of a semi-conductor can be determined even though the case of the semi-conductor cannot be seen.

In the foregoing specification I have described a presently preferred embodiment of this invention; however, it will be understood that this invention can be otherwise embodied within the scope of the following claims.

I claim:

1. A shunt for the leads of a semi-conductor disposed at intervals on the circumference of a circle comprising a cylindrical body of a conductive elastomer having "an axial hub, a plurality of spokes radially projecting from said hub, and a cylindrical rim in which said spokes terminate," the number of spokes being at least equal to the number of leads of the semi-conductor, and having a hole in each space between spokes dimensioned to fit conductively around a lead thrust thereinto.

2. The shunt of claim 1 in which the spokes extend axially beyond the rim at one end so that the ends of leads thrust into the shunt from the other end are visible between the spokes.

3. The shunt of claim 1 in which the axial length of the rim is less than that of the hub and the rim is positioned intermediate the ends of the hub.

4. The shunt of claim 1 in which the holes between the spokes converge from each end to a cylindrical portion axially intermediate the ends of the rim, the diameter of the cylindrical portion is just sufficient to pass the leads, and the cylindrical portion is at least two hole diameters in length.

5. The shunt of claim 1 in which the holes are disposed at intervals on the circumference of a circle of a diameter different from that of the lead circle.

6. The shunt of claim 1 in which the conductive elastomer is a molded elastomer.

7. The shunt of claim 6 in which the elastomer is softer than the leads.

8. The shunt of claim 6 in which the molded conductive elastomer is polyethylene containing a conductive additive.

* * * * *